(12) United States Patent
Schilling et al.

(10) Patent No.: US 9,952,330 B2
(45) Date of Patent: Apr. 24, 2018

(54) AUTOMOTIVE DEAD RECKONING WITH DYNAMIC CALIBRATION AND/OR DYNAMIC WEIGHTING

(71) Applicant: Autoliv ASP, Inc., Ogden, UT (US)

(72) Inventors: Robert Schilling, Londonderry, NH (US); Kevin G. Rochford, Windham, NH (US); David F. Jordan, Danville, NH (US)

(73) Assignee: Autolive ASP, Inc., Ogden, UT (US)

( * ) Notice: Subject to any disclaimer, the term of this patent is extended or adjusted under 35 U.S.C. 154(b) by 233 days.

(21) Appl. No.: 15/078,514

(22) Filed: Mar. 23, 2016

(65) Prior Publication Data

US 2017/0276801 A1     Sep. 28, 2017

(51) Int. Cl.
*G01C 21/00*     (2006.01)
*G01S 19/49*     (2010.01)
*G01S 19/40*     (2010.01)
*G01S 19/39*     (2010.01)
*G01S 19/48*     (2010.01)

(52) U.S. Cl.
CPC .............. *G01S 19/49* (2013.01); *G01S 19/39* (2013.01); *G01S 19/40* (2013.01); *G01S 19/48* (2013.01)

(58) Field of Classification Search
CPC combination set(s) only.
See application file for complete search history.

(56) References Cited

U.S. PATENT DOCUMENTS

| 5,646,857 A | 7/1997 | McBurney et al. ........ 364/449.7 |
| 2012/0169542 A1* | 7/2012 | Mathews ................ G01S 5/021 342/450 |
| 2017/0299724 A1* | 10/2017 | Hsu ........................ G01S 19/05 |

FOREIGN PATENT DOCUMENTS

| WO | WO 2008/148794 | 12/2008 | ............... G01S 1/00 |
| WO | WO 2012/045484 | 4/2012 | ............. G01C 22/00 |

\* cited by examiner

*Primary Examiner* — Adam M Alharbi
(74) *Attorney, Agent, or Firm* — Christopher P. Maiorana, PC

(57) ABSTRACT

A computer readable medium containing processor executable instructions configured to perform the steps of (i) monitoring a positional accuracy of location information calculated based on signals received from GNSS satellites, (ii) if the positional accuracy passes a quality check, using the location information to continuously perform a calibration of data received from one or more sensors and (iii) if the positional accuracy does not pass the quality check, cease the calibration of the data received from the sensors, wherein dead reckoning information is calculated from the data received from the sensors.

20 Claims, 9 Drawing Sheets

AUTOMOTIVE DEAD RECKONING WITH DYNAMIC CALIBRATION AND/OR DYNAMIC WEIGHTING

FIELD OF THE INVENTION

The present invention relates to global positioning generally and, more particularly, to automotive dead reckoning with dynamic calibration and/or dynamic weighting.

BACKGROUND OF THE INVENTION

Conventional solutions blend dead reckoning (DR) with Global Navigation Satellite System (GNSS) solutions in a fixed weighting. Fixed weighting compromises positional accuracy. Calibration of vehicle sensors is continuously updated, even when the GNSS solution is compromised by multipath interference or jamming. Such calibration with inaccurate GNSS information results in poor calibration.

Conventional automotive dead reckoning software uses either vehicle sensor information (i.e., wheel click, vehicle speed sensor (VSS), gyro) communicated on the vehicle bus, or a combination of vehicle sensor information and integrated sensors (i.e., gyro, accelerometer). The vehicle sensor information is first calibrated in order to supplement the acquired GNSS position. A dead reckoning solution can provide a location in the absence of GNSS satellite information (i.e., in a tunnel or parking garage). Conventional software begins a calibration of the sensors once a positional coordinate is determined, regardless of the accuracy of the coordinate (i.e., urban canyon and other multipath scenarios may introduce errors). Such conventional approaches lead to inaccurate calibration. Once a calibration is achieved, the calibration is constantly updated, even in less accurate areas (i.e., urban canyons where GNSS is less accurate).

It would be desirable to implement an automotive dead reckoning software with dynamic calibration and/or dynamic weighting.

SUMMARY OF THE INVENTION

The present invention concerns a computer readable medium containing processor executable instructions configured to perform the steps of (i) monitoring a positional accuracy of location information calculated based on signals received from GNSS satellites, (ii) if the positional accuracy passes a quality check, using the location information to continuously perform a calibration of data received from one or more sensors and (iii) if the positional accuracy does not pass the quality check, cease the calibration of the data received from the sensors, wherein dead reckoning information is calculated from the data received from the sensors.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Figure 1:
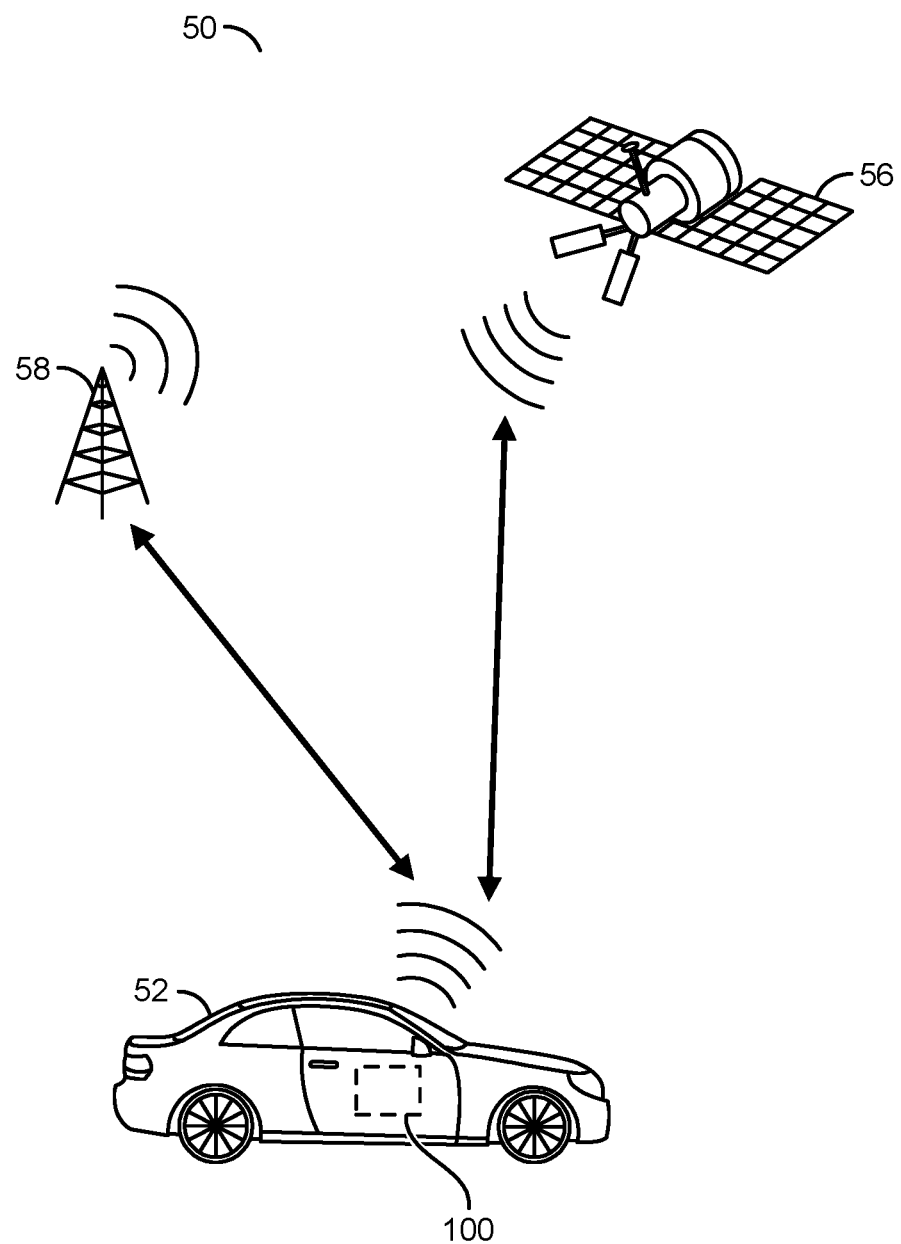
FIG. 1 is a diagram illustrating an open sky context.

Embodiments of the present invention include providing (i) dead reckoning that may be used in a vehicle or other mobile device, (ii) dynamic calibration of dead reckoning, (iii) dynamic weighting of dead reckoning data and GNSS location information, (iv) predictive adjustment of calibration parameters while in a dead reckoning mode based on trend data gathered when positional accuracy is sufficient and/or (v) a solution that has a minimal overhead.

An example implementation uses a Global Navigation Satellite System (GNSS) or Global Positioning System (GPS). Location information (e.g., coordinates) may be calculated from signals received from GNSS or GPS. The positional accuracy of the location information may be determined. The coordinates may be used to perform a calibration of the sensors for dead reckoning when the positional accuracy calculated from signals from the GNSS is within an acceptable tolerance. The acceptable tolerance may be a parameter that may be pre-configured according to the design criteria of a particular implementation. After a calibration is achieved (e.g., an initial calibration), updates to the calibration may continue in order to account for changing conditions (e.g., tire pressure change, gyro drift, etc.).

Updates are generally performed when the GNSS solution calculated is within an acceptable tolerance (e.g., the positional accuracy of the location information calculated from the signals received from the GNSS passes a quality check). When the calculated GNSS solution is not within the acceptable tolerance, or when no GNSS satellites are available, the updates to the calibration are discontinued until such time as the GNSS accuracy returns to within the acceptable tolerance.

In the case where dead reckoning information is blended with the calculated GNSS solution (e.g., the location information), the weighting will be a dynamic weighting based on an accuracy of the GNSS solution (e.g., positional accuracy). In an example, very little dead reckoning may be needed in an open sky setting. A more heavy weight may be applied for dead reckoning information in dead zones, such as urban canyons. The blended solution may provide a "fused" solution that is generally more accurate in urban canyons. In an open sky with an excellent GNSS solution, the dead reckoning blending may slightly add to the overall overhead and may only slightly compromise the overall accuracy. The dynamic weighting may be implemented to prevent reductions in accuracy caused by the dead reckoning information when determining a position (e.g., based on a reliability of the positional accuracy of the location information calculated from the signals received from the GNSS). In an example, the dynamic weighting may favor the location information calculated from the signals received from the GNSS over the dead reckoning information in open sky conditions. In another example, the dynamic weighting may increase a reliance on the dead reckoning information when the positional accuracy of the location information calculated from the signals received from the GNSS is determined to be poor.

Referring to FIG. 1, a diagram of a system 50 in an open sky context is shown. The open sky context may be an example of an acceptable tolerance context for the positional accuracy of the location information. The system 50 generally comprises a vehicle 52, satellites 56a-56n and a base station 58. The vehicle 50 may comprise an apparatus (or module or circuit) 100. The module 100 is described in more detail in connection with FIG. 5. While the vehicle 52 is shown, the apparatus 100 may be implemented in a mobile device (e.g., a cell phone, tablet computing device, a computer, a standalone GPS device, a fitness monitoring device, a smartwatch, etc.). In an example, the mobile device may be operated within a vehicle that is moving.

The vehicle 52 is shown connected to the satellites 56a-56n. In an example, the satellites 56a-56n may be part of the GNSS. Generally, four or more of the satellites 56a-56n may be connected. In another example, the connection to the satellites 56a-56n may be implemented through a GPS-type connection. The satellites 56a-56n may present signals (e.g., GNSS_A-GNSS_N). The apparatus 100 is shown in an open sky context (e.g., little and/or no interference and/or multipath errors between the apparatus 100 and the satellites 56a-56n). For example, in the open sky context system 50 the signal-to-noise ratio of the signals GNSS_A-GNSS_N may be high (e.g., the signals GNSS_A-GNSS_N may be reliable).

The vehicle 52 may also be configured to connect to the base station 58. In general, the base station 58 may be implemented as a fixed based station, such as a cellular tower, a user installed fixed base station, or another type of fixed base station. While only the base station 58 is shown, generally more than one of the base stations 58 may be implemented to provide signals used to calculate the location information. In some embodiments, the base stations 58 may be connected to the satellites 56a-56n, calculate the location information from the signals GNSS_A-GNSS_N and provide the location information to the vehicle 52. The connection to the base stations 58 may be implemented through a cellular network connection (e.g., 3G, 4G LTE, etc.), a Wi-Fi connection, a GPS-type connection and/or another type of connection. The type of connection to the base stations 58 may be varied according to the design criteria of a particular implementation. The apparatus 100 is shown in an open sky context (e.g., little and/or no interference and/or multipath errors between the apparatus 100 and the base stations 58).

The module 100 is shown located in the vehicle 52. The module 100 may be implemented as a single unit (e.g., an installed device and/or module) and/or a distributed unit. For example, various components of the module 100 may be implemented at various locations in and/or on the vehicle 52 and connected by an electronic network connecting one or more of the components and enabling a sharing of information in the form of digital signals (e.g., a serial bus, an electronic bus connected by wiring and/or interfaces, a wireless interface, etc.). In some embodiments, the module 100 may be implemented in an infotainment module of the vehicle 52. The location of the module 100 in and/or on the vehicle 52 may be varied according to the design criteria of a particular implementation.

In some embodiments, the apparatus 100 may be configured to receive the signals GNSS_A-GNSS_N sent by the satellites 56a-56n and/or the base stations 58. The apparatus 100 may be configured to calculate the location information (e.g., position data, coordinates, etc.) of the vehicle 52 based on the data in the signals GNSS_A-GNSS_N. Since the open sky context system 50 may be an example with limited and/or no interference and/or multipath errors, the positional accuracy of the location information calculated from the signals GNSS_A-GNSS_N may be within an acceptable tolerance (e.g., passes the quality check). In the open sky context system 50, the apparatus 100 may use the location information calculated from the signals GNSS_A-GNSS_N received from the satellites 56a-56n and/or the base stations 58 to calibrate the sensor data for dead reckoning.

In the open sky context system 50, the apparatus 100 may use the position location information calculated from the signals GNSS_A-GNSS_N received from the satellites 56a-56n and/or the base stations 58 to determine a current position of the vehicle 52 (e.g., without relying on dead reckoning data to supplement the position data). In some embodiments, some dead reckoning data may be used in the open sky context system 50 (e.g., a blended solution that favors location information over dead reckoning information).

In some embodiments, the apparatus 100 may monitor for trends in the calibration of sensors in the open sky context system 50. The trends may be used to extrapolate adjustments for calibration parameters when operating in a pure dead reckoning mode.

The quality check may be a horizontal accuracy and/or a three-dimensional accuracy determined when the location information (e.g., the GNSS solution) is calculated. The apparatus 100 may connect to different combinations of the satellites 56a-56n. In one example, the apparatus 100 may calculate one GNSS solution (e.g., location information) using the signals GNSS_A, GNSS_D, GNSS_I and GNSS_M received from the satellites 56a, 56d, 56i and 56m. In another example, the apparatus 100 may calculate another GNSS solution (e.g., location information) using the signals GNSS_B, GNSS_C, GNSS_E, GNSS_F and GNSS_L received from the satellites 56b, 56c, 56e, 56f and 56l. If the GNSS solution based on the signals GNSS_A, GNSS_D, GNSS_I and GNSS_M and the GNSS solution based on the signals GNSS_B, GNSS_C, GNSS_E, GNSS_F and GNSS_L coincide (or are reasonably close), then the positional accuracy of the location information may be reliable (e.g., the vehicle 52 may be in the open sky context system 50). If the GNSS solution based on the signals GNSS_A, GNSS_D, GNSS_I and GNSS_M and the GNSS solution based on the signals GNSS_B, GNSS_C, GNSS_E, GNSS_F and GNSS_L do not coincide (or are not reasonably close), then the positional accuracy of the location information may not be reliable and the apparatus 100 may rely on dead reckoning (or a combination of dead reckoning and the location information) to determine the position coordinates of the vehicle 52. The threshold used to determine whether the location information is reliable may be varied according to the design criteria of a particular implementation.

Figure 2:
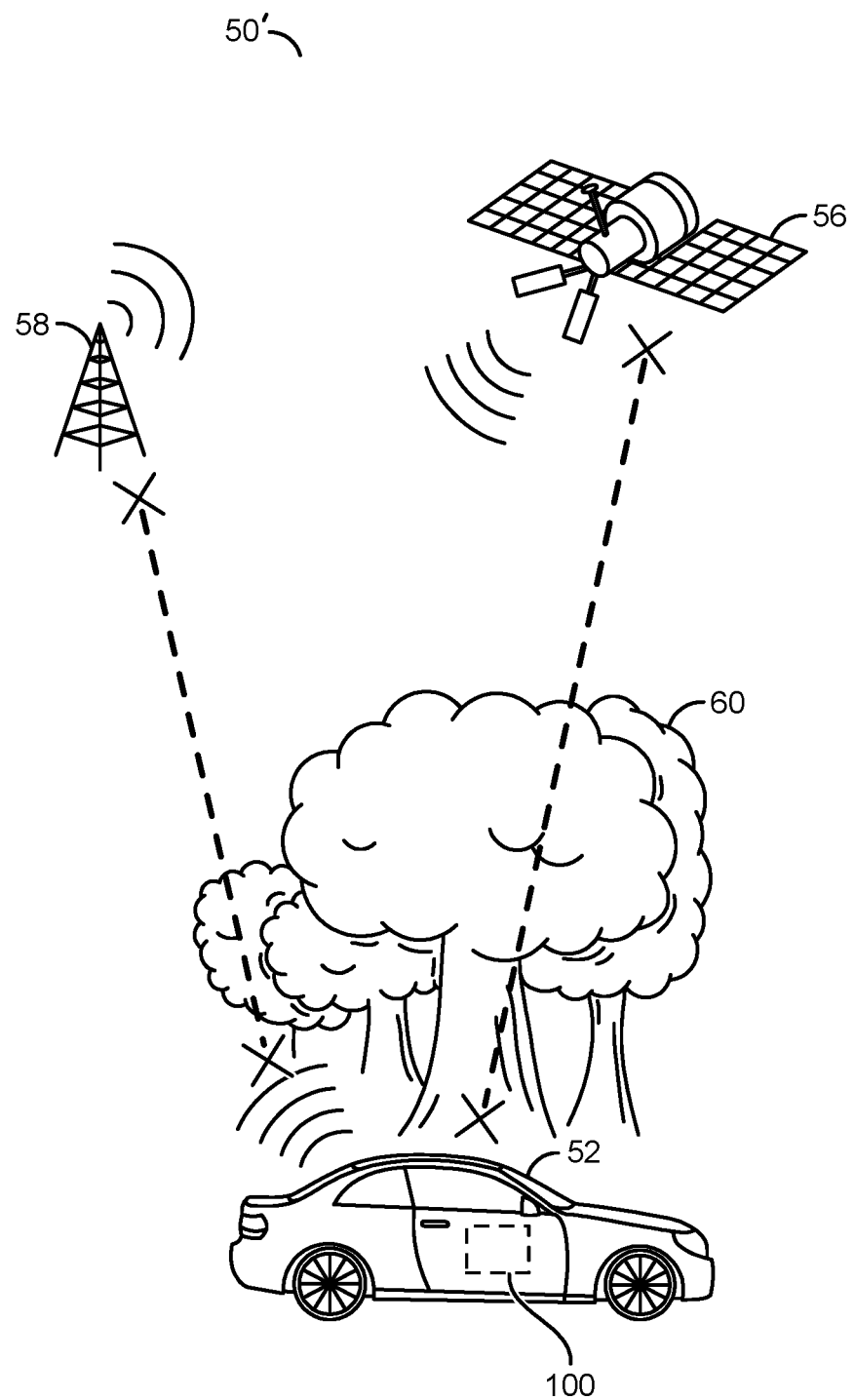
FIG. 2 is a diagram illustrating an unacceptable tolerance context.

Referring to FIG. 2, a diagram of a system 50' in an unacceptable tolerance context is shown. The unacceptable tolerance context system 50' may comprise the vehicle 52, the satellite 56, the base station 58, the apparatus 100 and/or local conditions 60. The satellites 56a-56n are shown presenting the signals GNSS_A'-GNSS_N' to the vehicle 52. The signal-to-noise ratio of the signals GNSS_A'-GNSS_N' may be poor. The unacceptable tolerance context 50' may be when the location information calculated from the signals (e.g., GNSS_A'-GNSS_N') presented by the GNSS satellites 56a-56n is determined to be poor. The local conditions 60 are represented as a group of trees blocking transmission of the signals GNSS_A'-GNSS_N' between the apparatus 100 and the satellites 56a-56n and/or the apparatus 100 and the base stations 58. For example, the signals GNSS_A'-GNSS_N' may be of poor quality and/or no signal transmission may be received due to the local conditions 60 (e.g., an unacceptable tolerance of positional accuracy).

The local conditions 60 may be any type of interference and/or multipath factor that may affect a determination of location information (e.g., position coordinates). The local conditions 60 may reduce a reliability of the location information calculated from the signals GNSS_A'-GNSS_N'. For example, the local conditions 60 may be due to ionospheric interference, noise, signal degradation caused by dense urban areas, signal degradation caused by tall buildings, etc. The type and/or cause of the local conditions 60 may be varied according to the design criteria of a particular implementation.

Since the unacceptable tolerance context system 50' may be an example with poor quality and/or no signal transmission, the positional accuracy of the location information calculated from the signals GNSS_A'-GNSS_N' presented by the satellites 56a-56n may be within an unacceptable tolerance (e.g., does not pass the quality check). In the unacceptable tolerance context system 50', the apparatus 100 may not use the location information calculated from the data in the signals GNSS_A'-GNSS_N' and/or the base stations 58 to calibrate data from the sensors for dead reckoning. In the unacceptable tolerance context system 50', the apparatus 100 may not use the location information calculated from the data in the signals GNSS_A'-GNSS_N' and/or the base stations 58 to determine the position of the vehicle 52. In the unacceptable tolerance context system 50', the apparatus 100 may use the dead reckoning information to determine position of the vehicle 52 (e.g., the apparatus 100 may operate in the pure dead reckoning mode).

In some embodiments, in the unacceptable tolerance context system 50', calibration of sensors may be temporarily disabled until the positional accuracy of the GNSS solution calculated is within an acceptable tolerance. In some embodiments, in the unacceptable tolerance context system 50', trends determined while within an acceptable tolerance context may be used to extrapolate adjustments for calibration parameters when operating in the pure dead reckoning mode.

Figure 3:
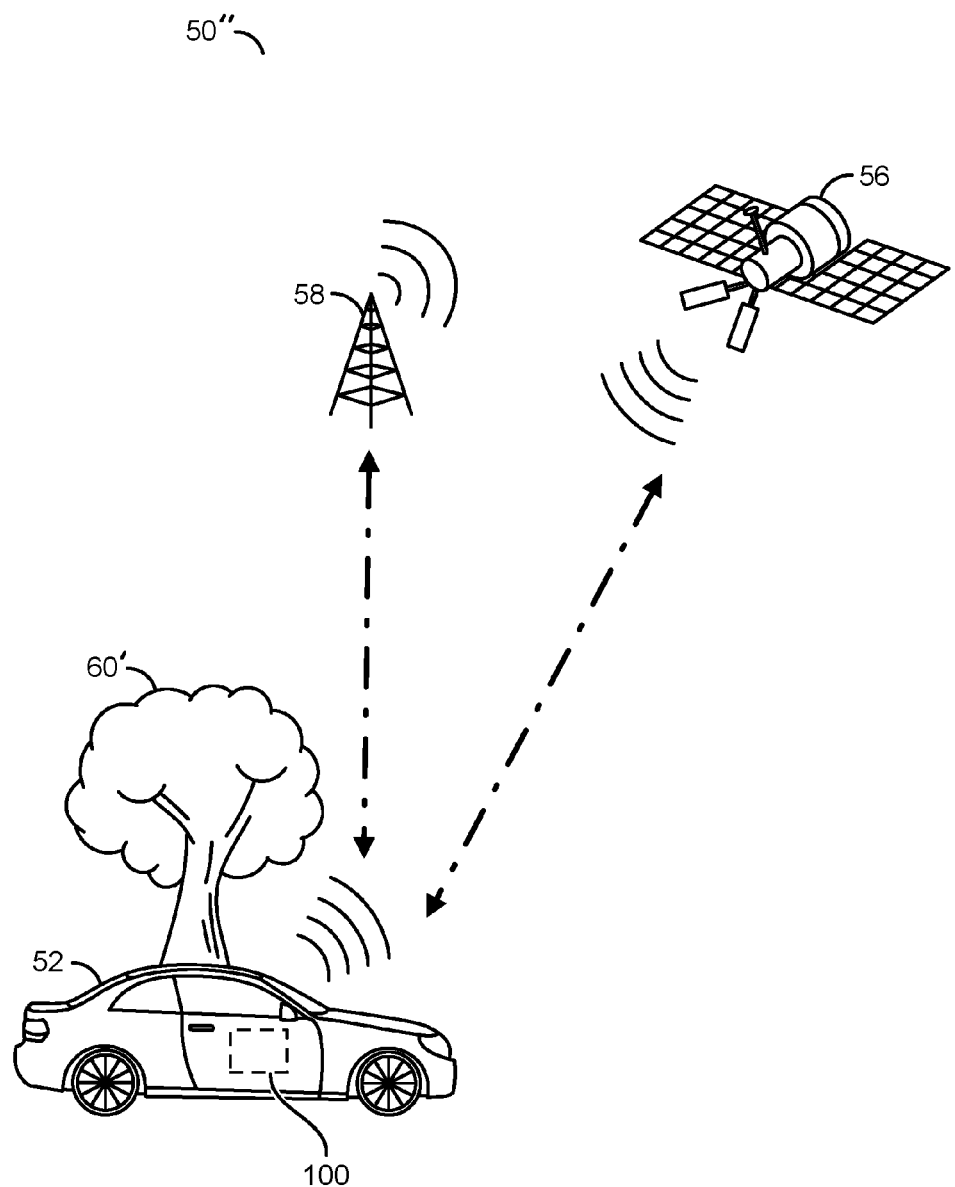
FIG. 3 is a diagram illustrating a dynamic weighting context.

Referring to FIG. 3, a diagram of a system 50'' in a dynamic weighting context is shown. The dynamic weighting context system 50'' may be an example of an acceptable tolerance context (e.g., passes the quality check). The dynamic weighting context system 50'' may comprise the vehicle 52, the satellites 56a-56n, the base station 58, the local conditions 60' and/or the apparatus 100. The satellites 56a-56n are shown presenting the signals GNSS_A''-GNSS_N'' to the vehicle 52. The signal-to-noise ratio of the signals GNSS_A''-GNSS_N'' may be acceptable (e.g., moderately reliable). The dynamic weighting context system 50'' may be when the location information calculated from the signals (e.g., GNSS_A''-GNSS_N'') presented by the GNSS satellites 56a-56n is determined to be acceptable but may have some errors. The local conditions 60' are represented as a single tree partially blocking transmission of signals GNSS_A''-GNSS_N'' between the apparatus 100 and the satellites 56a-56n and/or the apparatus 100 and the base stations 58. For example, a signal transmission by the satellites 56a-56n may be received but due to the local conditions 60', the signal may have some errors (e.g., an acceptable tolerance of positional accuracy).

Since the dynamic weighting context system 50'' may be an example with some errors, the positional accuracy of the location information calculated from the signals GNSS_A''-GNSS_N'' may be within an acceptable tolerance. In the dynamic weighting context system 50'', the apparatus 100 may use the location information calculated from the signals GNSS_A''-GNSS_N'' and/or the base stations 58 and the dead reckoning information to determine the position of the vehicle 52. An amount of reliance (e.g., weighting) on the calculated location information and the dead reckoning information may be varied dynamically based on the positional accuracy of the GNSS solution (e.g., the calculated location information). In one example, more weight may be applied to the location information than the dead reckoning information when the local conditions 60' cause less errors. In another example, more weight may be applied to the dead reckoning information than the location information when the local conditions 60' cause more errors. The amount of weighting applied to the location information and/or the dead reckoning information may be varied according to the design criteria of a particular implementation.

Figure 4:
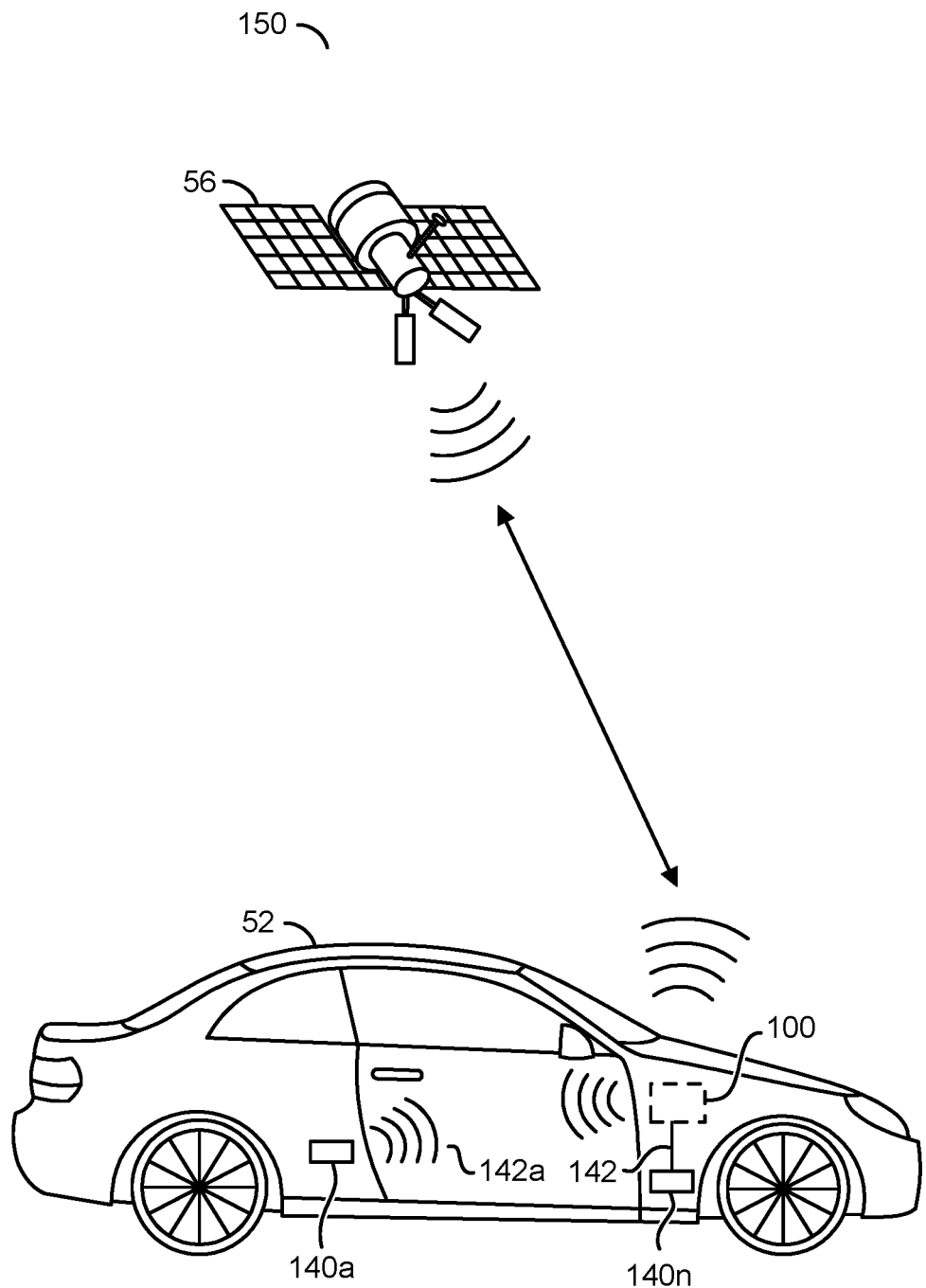
FIG. 4 is a diagram of a context of a number of sensors.

Referring to FIG. 4, a diagram 150 of the vehicle 52 is shown. Connections are shown to the GNSS satellites 56a-56n. In an example, the vehicle 52 (or components of the vehicle 52) may connect to four or more of the satellites 56a-56n to receive the signals GNSS_A-GNSS_N. A number of sensors 140a-140n are shown. The sensors 140a-140n may be connected to the module 100 through a bus 142, or through a wireless connection 142a. The particular type of connection between the sensors 140a-140n and the module 100 may be varied to meet the design criteria of a particular implementation.

The sensors 140a-140n may be configured to capture information used to perform dead reckoning calculations. In the example shown in FIG. 4, the sensors 140a-140n may be vehicle sensors. Data from the sensors 140a-140n may be used to determine the dead reckoning data. The sensors 140a-140n may be various types of sensors configured to determine vehicle movement (e.g., magnetometers, accelerometers, wheel click sensors, vehicle speed sensors, gyroscopes, etc.). For example, data from the sensors 140a-140n may be used to determine distances and/or directions traveled from a reference point. The types of sensors 140a-140n implemented may be varied according to the design criteria of a particular implementation.

Data from the sensors 140a-140n may become less accurate over time (e.g., sensor information drift). If data from the sensors 140a-140n is unreliable then accuracy of dead reckoning data may become unreliable. The apparatus 100 may be configured to calibrate data received from the sensors 140a-140n. The apparatus 100 may determine calibration parameters (e.g., coefficients) to transform data received from the sensors 140a-140n to compensate for sensor information drift. The calibration applied may be varied according to the design criteria of a particular implementation.

Calibration may be performed when the location information is within an acceptable tolerance (e.g., when the positional accuracy of the location information calculated from the signals GNSS_A-GNSS_N is sufficient to serve as a positional reference for the sensor-based vehicle movement positional computations). For example, when the positional accuracy of the location information calculated from the signals GNSS_A-GNSS_N is within an acceptable tolerance, the module 100 may compare the dead reckoning data to the location information as a positional reference to determine the coefficients to apply to the data received from the sensors 140a-140n.

In some embodiments, the module 100 may be configured to monitor trends based on data gathered on the calibration coefficients during times where there is an acceptable tolerance. The trends may be monitored by the module 100 to perform predictive (e.g., extrapolated) adjustments of the calibration parameters when operating in pure dead reckoning mode (e.g., times where there is an unacceptable tolerance). For example, the module 100 may establish a set of coefficients related to input from the gyroscope sensor (e.g., the sensor 140i). The module 100 may continually (or continuously, or periodically) refine the set of coefficients for the gyroscope sensor 140i when the positional accuracy of the location information calculated from the signals GNSS_A-GNSS_N is within the acceptable tolerance. The refinement of the set of coefficients for the gyroscope sensor 140i may establish a trend that may be expected to continue based on vehicle and/or environmental characteristics in the absence of the signals GNSS_A-GNSS_N (e.g., during times when there is an unacceptable tolerance). The implementation of the trend monitoring and/or extrapolation performed by the module 100 may be varied according to the design criteria of a particular implementation.

Figure 5:
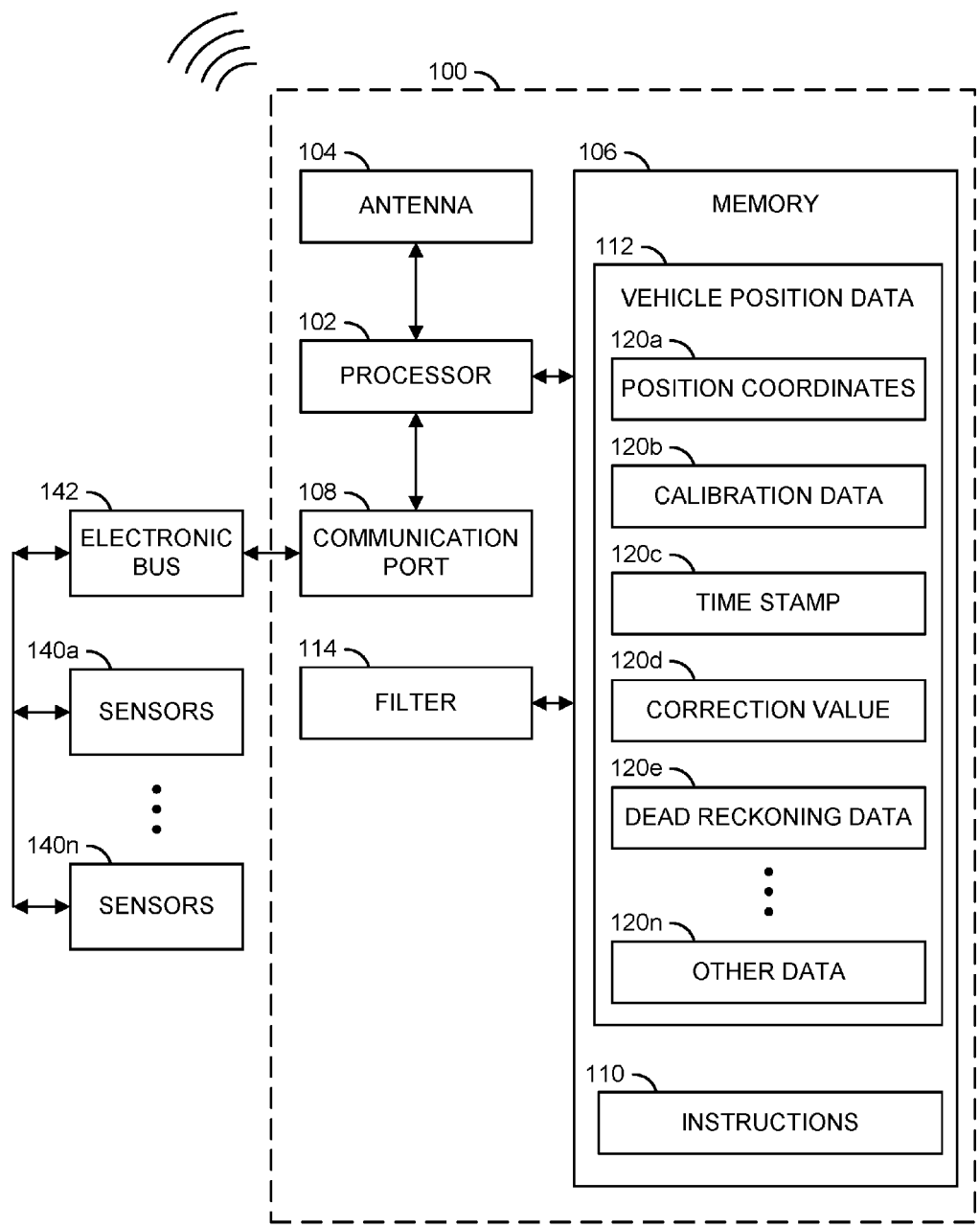
FIG. 5 is a diagram illustrating a module.

Referring to FIG. 5, a diagram of the module 100 is shown. The apparatus 100 generally comprises a block (or circuit) 102, a block (or circuit) 104, a block (or circuit) 106 and/or a block (or circuit) 108. The sensors 140a-140n are shown connected to the module 100 via the bus 142. The circuit 102 may implement a processor. The circuit 104 may implement an antenna. The circuit 106 may implement a memory. The circuit 108 may implement a communication port. Other blocks (or circuits) may be implemented (e.g., a clock circuit, I/O ports, power connectors, etc.). For example, a block (or circuit) 114 is shown implementing a filter.

The processor 102 may be implemented as a microcontroller and/or a GNSS chipset. In some embodiments, the processor 102 may be a combined (e.g., integrated) chipset implementing processing functionality and the GNSS chipset. In some embodiments, the processor 102 may be comprised of two separate circuits (e.g., the microcontroller and the GNSS chipset). In an example, an off-board circuit (e.g., a component that is not part of the module 100) may perform the functions of the GNSS chipset and send information to the module 100 (e.g., via the bus 142). In another example, an off-board circuit (e.g., a component that is not part of the module 100) may perform functions for determining dead reckoning data and send information to the module 100 (e.g., via the bus 142). The design of the processor 102 and/or the functionality of various components of the processor 102 may be varied according to the design criteria of a particular implementation.

The antenna 104 may be implemented as a dual band antenna capable of connecting to both a cellular network (e.g., to provide a potential connection option to the base stations 58) and/or a GNSS network (e.g., the satellites 56a-56n). In another example, the antenna 104 may be implemented as two antennas. For example, one antenna may be specifically designed to connect to the base stations 58, while another antenna may be implemented as being optimized to connect to the GNSS network satellites 56a-56n. The antenna 104 may be implemented as discrete antenna modules and/or a dual band antenna module. In some embodiments, the antenna 104 may be implemented as an off-board circuit (e.g., a component that is not part of the module 100). For example, the antenna 104 may send/receive data to/from the module 100 via the electronic bus 142. The implementation of the antenna 104 may be varied according to the design criteria of a particular implementation.

The memory 106 may comprise a block (or circuit) 110 and a block (or circuit) 112. The block 110 may store computer readable instructions (e.g., instructions readable by the processor 102). The block 112 may store vehicle position data. For example, the vehicle position data 112 may store various data sets 120a-120n. Examples of the data sets may be position coordinates 120a, calibration data 120b, a time stamp 120c, a correction value 120d, dead reckoning data 120e and/or other data 120n.

The position coordinates 120a may store location information data calculated by the module 100 from the signals GNSS_A-GNSS_N presented by the GNSS satellites 56a-56n. The signals GNSS_A-GNSS_N may provide data from which a particular resolution of location information positional accuracy may be calculated. In some embodiments, the position coordinates 120a may not provide sufficient positional accuracy for particular applications (e.g., lane detection, autonomous driving, etc.). The correction value 120d may be used to improve the accuracy of the position coordinates 120a. In some embodiments, the position coordinates 120a may be calculated by the filter 114.

The calibration data 120b may comprise parameters (e.g., coefficients) used to transform data received from the sensors 140a-140n. The calibration data 120b may provide many sets of coefficients (e.g., one set of coefficients for each of the sensors 140a-140n). The calibration data 120b may be updatable. For example, the calibration data 120b may store current values as coefficients for the sensors 140a-140n and as the data from the sensors 140a-140n drifts (e.g., based on a comparison of the position coordinates 120a and the dead reckoning data 120e when positional accuracy is within an acceptable tolerance) the module 100 may update the calibration data 120b in order to maintain accuracy of the dead reckoning data 120e. The format of the calibration data 120b may vary based on the design criteria of a particular implementation.

The time stamp 120c may be used to determine an age of the vehicle position data 112. For example, the time stamp 120c may be used to determine if the vehicle position data 112 should be considered reliable or unreliable. The time stamp 120c may be updated when the module 100 updates the vehicle position data 112. For example, the time stamp 120c may record a time in Coordinated Universal Time (UTC) and/or in a local time. The implementation of the time stamp 120c may be varied according to the design criteria of a particular implementation.

The correction value 120d may be used to augment (e.g., improve) a precision of the position coordinates 120a. The correction data 120d may implement real-time accuracy correction for the position coordinates 120a. The correction data 120d may be used to account (e.g., compensate) for the local conditions 60 that may affect an accuracy of the position coordinates 120a. For example, the correction value 120d may comprise a weighted blending of information from the position coordinates 120a and the dead reckoning data 120e. An amount of weighting applied to the data component from the position coordinates 120a and the data component from the dead reckoning data 120e used for the weighted blending may be determined based on the determined positional accuracy (e.g., the reliability) of the location information calculated from the signals GNSS_A-GNSS_N and/or data from the base stations 58.

The dead reckoning data 120e may be used to store past and/or present information to determine positions traveled by the vehicle 52. For example, the dead reckoning data 120e may store a previously determined position of the vehicle 52 (e.g., estimated speed, estimated time of travel, estimated location, etc.). The previously determined position may be used to help determine a current position of the vehicle 52. In some embodiments, the dead reckoning data 120e may be determined based on data from the sensors 140a-140n of the vehicle 52 (e.g.., an on-board gyroscope and/or wheel click messages). The implementation and/or the information stored to determine the dead reckoning data 120e may be varied according to the design criteria of a particular implementation.

Various other types of data (e.g., the other data 120n) may be stored as part of the vehicle position data 112. For example, the other data 120n may store trend information for the calibration data 120b. For example, the other data 120n may store past data values of the calibration data 120b and/or current data values of the calibration data 120b. The past and current data values of the calibration data 120b may be compared to determine trends used to extrapolate and/or predict potential future values for the calibration data 120b. For example, the trend information may be used to continue to refine the calibration data 120b when the module 100 is operating in a pure dead reckoning mode (e.g., the location information fails the quality check).

The communication port 108 may allow the module 100 to communicate with external devices and/or the sensors 140a-140n. For example, the module 100a is shown connected to the external electronic bus 142. In some embodiments, the electronic bus 142 may be implemented as a vehicle CAN bus. The electronic bus 142 may be implemented as an electronic wired network and/or a wireless network (e.g., the wireless connection 142a). Generally, the electronic bus 142 may connect one or more component of the vehicle 52 enabling a sharing of information in the form of digital signals (e.g., a serial bus, an electronic bus connected by wiring and/or interfaces, a wireless interface, etc.).

The communication port 108 may allow the module 100 to share the vehicle position data 112 with various infrastructure and/or components of the vehicle 52. The communication port 108 may allow the module 100 to receive information from the sensors 140a-140n of the vehicle 52 (e.g., the on-board gyroscope data and/or wheel click messages used to determine the dead reckoning data 120e). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The module 100 may be configured to calculate a position and/or broadcast data (e.g., via the communication port 108) such as the positional coordinates 120a, an age of the data (e.g., when the data was last updated such as the time stamp 120c), the correction value 120d and/or other data 120n. A method of communication by the communication port 108 and/or the type of data transmitted may be varied according to the design criteria of a particular implementation.

The filter 114 may be configured to perform a linear quadratic estimation. For example, the filter 114 may implement a Kalman filter. Generally, the filter 114 may operate recursively on input data to produce a statistically optimal estimate. For example, the filter 114 may be used to calculate the position coordinates 120a and/or estimate the accuracy of the position coordinates 120a. In some embodiments, the filter 114 may be implemented as a separate module. In some embodiments, the filter 114 may be implemented as part of the memory 106 (e.g., the stored instructions 110). The implementation of the filter 114 may be varied according to the design criteria of a particular implementation.

The processor 102 may be configured to execute stored computer readable instructions (e.g., the instructions 110 stored in the memory 106). The processor 102 may perform one or more steps based on the stored instructions 110. In an example, the processor 102 may calculate the location information (e.g., based on the received signals GNSS_A-GNSS_N). In another example, one of the steps executed/performed by the processor 102 may determine the dynamic blend of location information and dead reckoning information and/or the calibration of the sensors 140a-140n. The instructions executed and/or the order of the instructions performed by the processor 102 may be varied according to the design criteria of a particular implementation. The processor 102 is shown sending data to and/or receiving data from the antenna 104, the memory 106 and/or the communication port 108.

The processor 102 may be configured to determine coefficients (e.g., parameters) for calibrating signals generated by the sensors 140a-140n. For example, the processor 102 may be configured to compare dead reckoning data based on data from the sensors 140a-140n with position coordinates calculated from the signals GNSS_A-GNSS_N. Based on the comparison, the processor 102 may determine coefficients to transform (e.g., offset) raw data received from the sensors 140a-140n into data that may be used to determine a position with greater accuracy than using the data without being transformed by the coefficients.

The module 100 may be configured as a chipset, a system on chip (SoC) and/or a discrete device. In some embodiments, the module 100 may comprise a GNSS chipset and be configured to calculate a position, velocity and time (PVT) solution and not a dead reckoning solution (e.g., the calibration data 120b may be sent to another component to determine the dead reckoning solution). For example, PVT may be considered a bare minimum output for navigation. In some embodiments, the module 100 may comprise a GNSS chipset and be configured to calculate a PVT solution and the dead reckoning solution. In some embodiments, the module 100 may be configured to receive a data stream that provides the PVT solution and may not determine the dead reckoning solution (e.g., the module 100 receives PVT data from an off-board component, determines the calibration data 120b and sends the calibration data 120b to an off-board component to determine the dead reckoning solution). In some embodiments, the module 100 may be configured to receive a data stream that provides the PVT solution and be configured to calculate the dead reckoning solution.

In some embodiments, the module 100 may use an external processor (e.g., an off-board processor) to perform the calculations to determine the calibration data 120b (e.g., the memory 106 provides the instructions 110 to the external processor to calculate the calibration data 120b). In some embodiments, the instructions 110 may be Stored oil an external memory. The implementation of the module 100 may be varied according to the design criteria of a particular implementation.

Generally, the module 100 receives and/or determines a PVT solution, a blended PVT and dead reckoning solution and/or a PVT data component and a dead reckoning data component (e.g., calculates one or two data components from the signals GNSS_A-GNSS_N). The module 100 may be configured to separate and/or extract the data component of the dead reckoning data 120e and the data component of the PVT solution (e.g., the location data). The data component of the dead reckoning data 120e and the position coordinates 120a may be compared using the instructions 110. The instructions 110 may comprise steps to determine a solution that weights and/or blends the data component for the dead reckoning data 120e with the data component of the position coordinates 120a based on the PVT accuracy.

Figure 6:
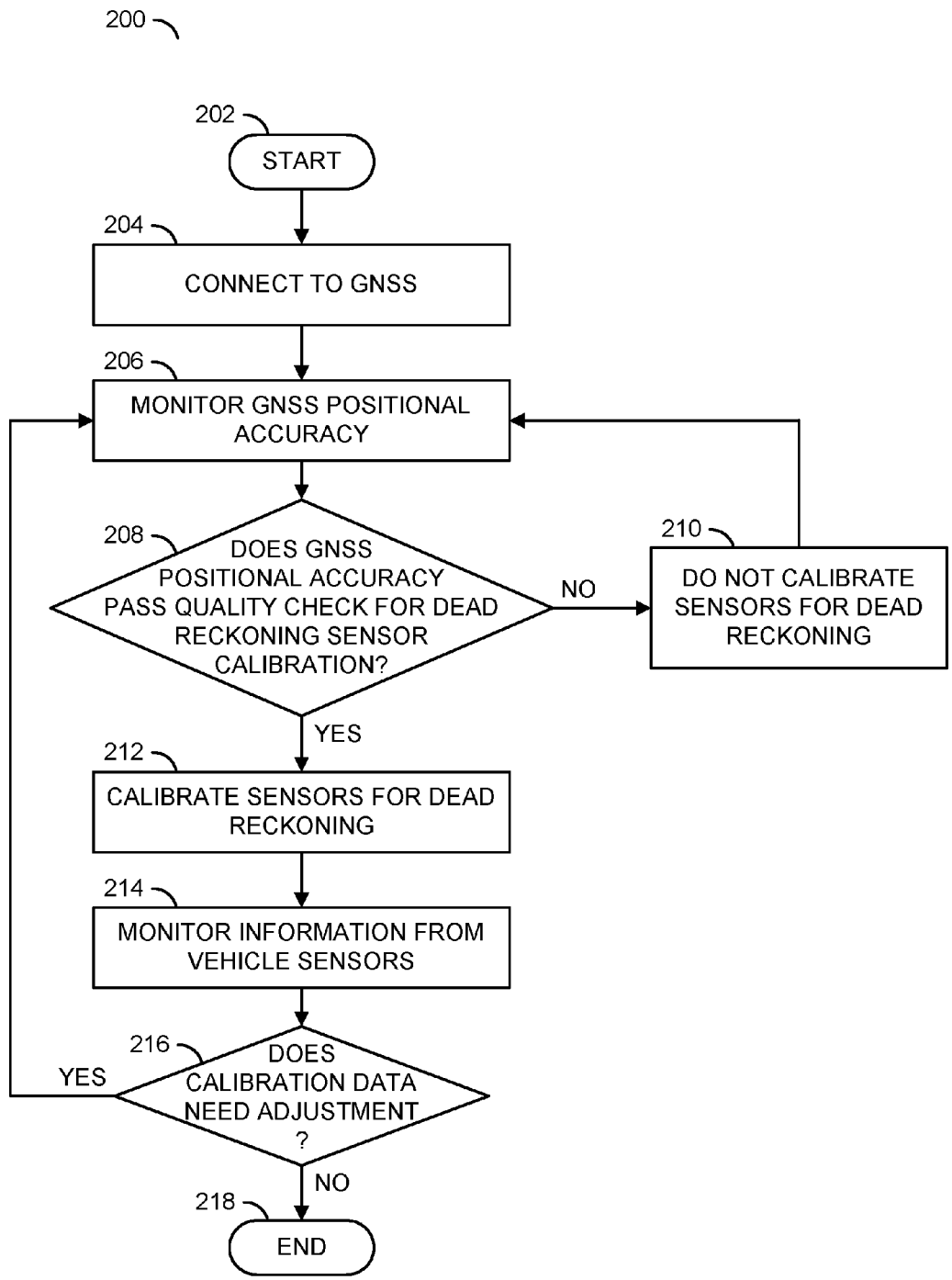
FIG. 6 is a flow diagram of a calibration process.

Referring to FIG. 6, a flow diagram of a method (or process) 200 is shown. The process 200 represents an initial calibration. The method 200 implements an update to a calibration. The method 200 generally comprises a step (or state) 202, a step (or state) 204, a step (or state) 206, a decision step (or state) 208, a step (or state) 210, a step (or state) 212, a step (or state) 214, a decision step (or state) 216, and a step (or state) 218.

The step 202 may be a start step. Next, in the step 204, the module 100 may connect to the GNSS satellites 56a-56n using the antenna 104 (e.g., receive the signals GNSS_A-GNSS_N). In the step 206, the processor 102 may monitor the positional accuracy of the data calculated from the signals GNSS_A-GNSS_N (e.g., the positional accuracy of the location information). Next, in the decision step 208, the processor 102 determines whether the positional accuracy of the location information calculated from the signals GNSS_A-GNSS_N passes a quality check prior to being used for dead reckoning sensor calibration. For example, the quality check may be based on a signal strength of the signals GNSS_A-GNSS_N, the local conditions 60 and/or a signal to noise ratio of the signals GNSS_A-GNSS_N (e.g., the reliability of the position coordinates 120a).

If the quality check fails, the method 200 moves to the step 210. In the step 210, the processor 102 does not perform calibration of the sensors 140a-140n for dead reckoning (e.g., the calibration data 120b is not updated). The method 200 then moves back to the step 206. If the decision step 208 determines that the positional accuracy of the location information calculated from the signals GNSS_A-GNSS_N does pass the quality check and may be used for dead reckoning sensor calibration, the method 200 moves to the step 212. In the step 212, the processor 102 may calibrate the sensors 140a-140n for dead reckoning (e.g., determine the calibration data 120b used to adjust the data received from the sensors 140a-140n).

In the step 214, the processor 102 may monitor information from the vehicle sensors 140a-140n. Next, the method 200 may move to the decision step 216. In the decision step 216, the processor 102 determines whether the calibration data 120b needs an adjustment. If not, the method 200 moves to the end step 218. If the decision step 216 determines that the calibration data 120b needs adjustment, the method 200 moves back to the step 206. The steps 206-216 may be repeated. In general, as long as criteria in the decision step 208 is met, calibration may be continually (or continuously or periodically) updated.

Figure 7:
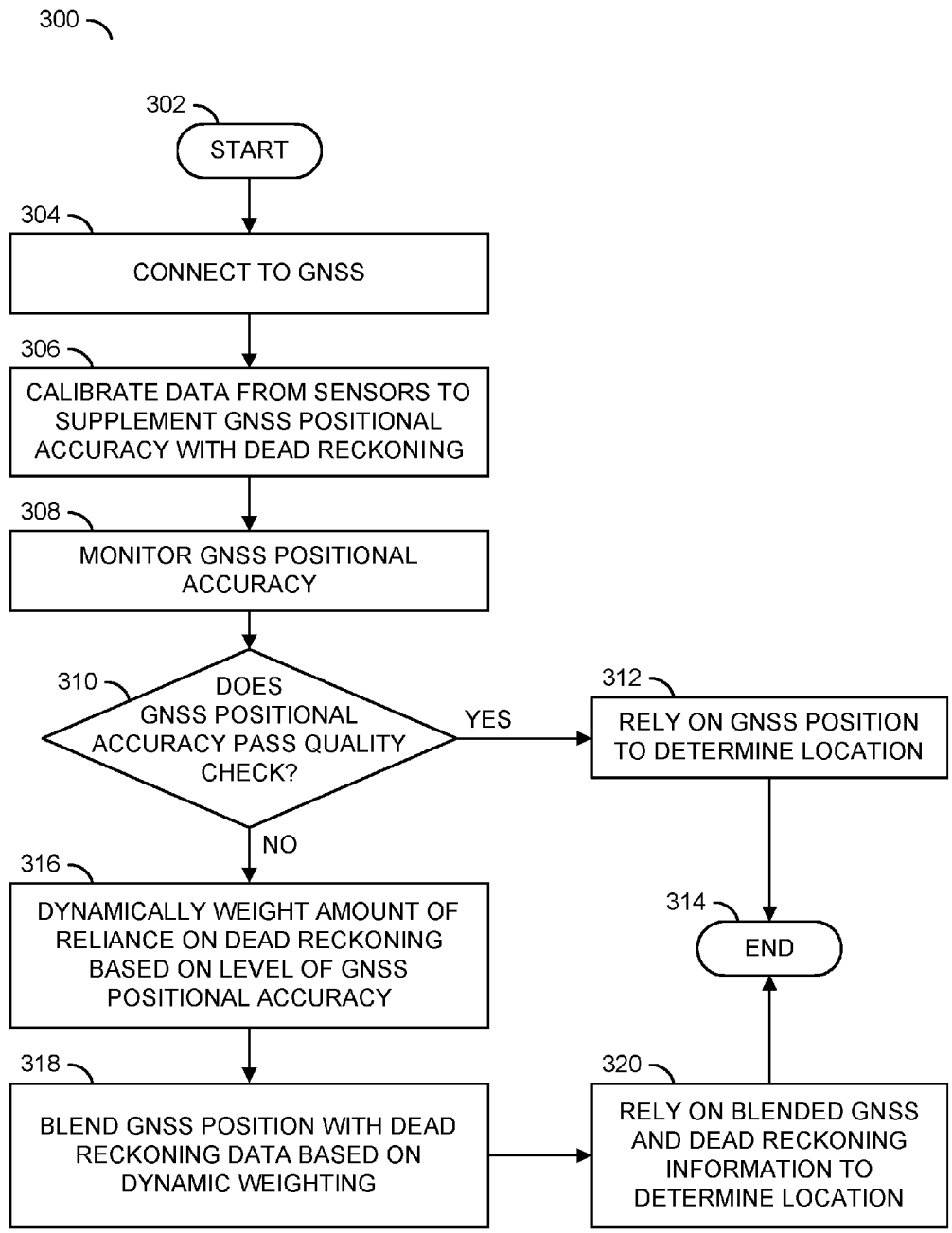
FIG. 7 is a flow diagram illustrating dynamic weighting process.

Referring to FIG. 7, a flow diagram of a method (or process) 300 is shown. The process 300 represents a dynamic weighting process. The method 300 generally comprises a step (or state) 302, a step (or state) 304, a step (or state) 306, a step (or state) 308, a decision step (or state) 310, a step (or state) 312, a step (or state) 314, a step (or state) 316, a step (or state) 318, and a step (or state) 320.

The step 302 generally comprises a start step. In the step 304, the module 100 may connect to the GNSS satellites 56a-56n using the antenna 104 (e.g., receive the signals GNSS_A-GNSS_N).

Next, in the step 306, the processor 102 may calibrate data from one or more sensors 140a-140n to supplement the positional accuracy calculated from the signals GNSS_A-GNSS_N with dead reckoning information. In the step 308, the processor 102 may monitor the positional accuracy of the data calculated from the signals GNSS_A-GNSS_N (e.g., the positional accuracy of the position coordinates 120a). Next, in the decision step 310, the processor 102 may determine whether the positional calculated from the positional accuracy calculated from the signals GNSS_A-GNSS_N passes a quality check prior to being used for dead reckoning sensor calibration.

If the positional accuracy calculated from the signals GNSS_A-GNSS_N passes the quality check, the method 300 moves to the step 312. In the step 312, the module 100 may rely on the GNSS position calculated from the signals GNSS_A-GNSS_N (e.g., the position coordinates 120a) to determine a location of the vehicle 52. The method 300 then ends at the step 314. If the decision step 310 determines that the positional accuracy calculated from the signals GNSS_A-GNSS_N does not pass the quality check, the method 300 moves to the step 316. In the step 316, the processor 102 may dynamically weight the amount of reliance on the dead reckoning data 120e based on a level of the positional accuracy calculated from the signals GNSS_A-GNSS_N. Next, the method 300 moves to the step 318. In the step 318, the processor 102 may blend the position coordinates 120a calculated from the signals GNSS_A-GNSS_N with the dead reckoning data 120e based on the dynamic weighting. Next, in the step 320, the module 100 may rely on the blended GNSS solution and/or dead reckoning information to determine a location. The method 300 then ends at the step 314.

Figure 8:
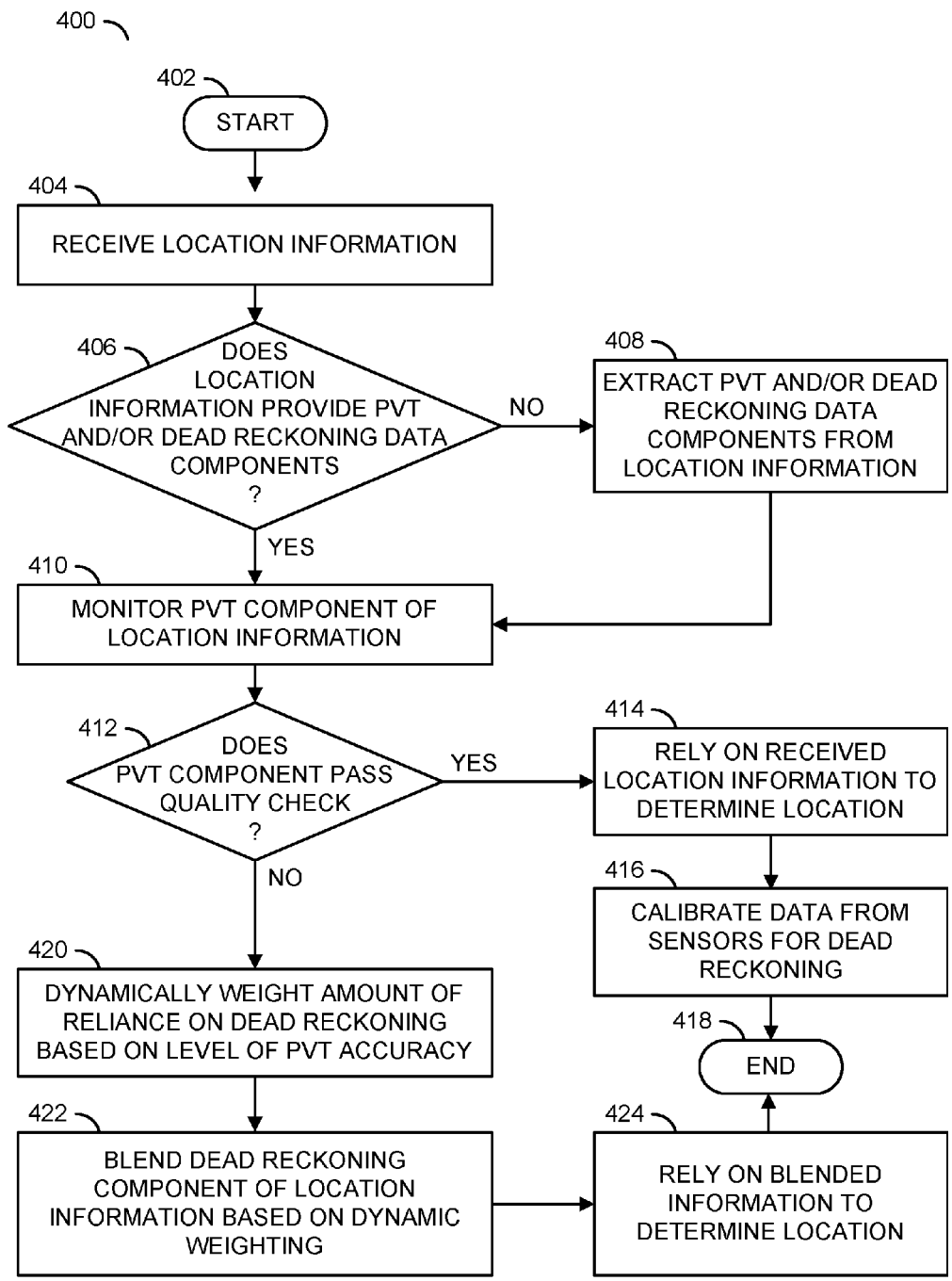
FIG. 8 is a flow diagram illustrating an alternate dynamic weighting process.

Referring to FIG. 8, a flow diagram of a method (or process) 400 is shown. The process 400 represents an alternate dynamic weighting process. The process 400 may be implemented without a direct communication with the GNSS satellites 56a-56n. The method 400 generally comprises a step (or state) 402, a step (or state) 404, a decision step (or state) 406, a step (or state) 408, a step (or state) 410, a decision step (or state) 412, a step (or state) 414, a step (or state) 416, a step (or state) 418, a step (or state) 420, a step (or state) 422, and a step (or state) 424.

The step 402 may be a start step. In the step 404, the module 100 may receive location information. The location information may be received from an external component, such as an antenna located on the vehicle 52, another component of the vehicle 52 that has an antenna, the bus 142, or another component that provides the location information calculation. Next, in the decision step 406, the processor 102 may determine whether the location information received in the step 402 provides position, velocity, time (PVT) data and/or dead reckoning data components.

If the information received in the step 402 does not provide a PVT data component and/or dead reckoning data component, the method 400 moves to the step 408. If so, the method 400 moves to the step 410. In the step 408, the processor 102 may extract the PVT component and/or the dead reckoning data component from the location information, then the method 400 moves to the step 410. In the step 410, the processor 102 may monitor the PVT component of the location information. Next, the method 400 may move to the decision step 412. In the decision step 412, the processor 102 may determine whether the PVT component passes a quality check.

If the PVT component passes the quality check, the method 400 moves to the step 414. In the step 414, the module 100 may rely on the location information received to determine the location of the vehicle 52. Next, in the step 416, the processor 102 may calibrate data from the sensors 140a-140n for dead reckoning (e.g., perform calculations to determine the calibration data 120b based on steps provided by the instructions 110). The method 400 then ends at the step 418.

If the PVT component does not pass a quality check in the decision step 412, the method 400 moves to the step 420. In the step 420, the processor 102 may be used to dynamically weight the amount of reliance on the dead reckoning data 120e (e.g., the dead reckoning component of the location information) based on the level of the PVT accuracy. Next, in the step 422, the processor 102 may blend the dead reckoning data component of the location information based on the dynamic weighting (e.g., blend the dead reckoning data component 120e with the PVT component 120a). Next, the method 400 moves to the step 424. In the step 424, the module 100 may rely on the blended information to determine the location. The method 400 then ends at the step 418.

Figure 9:
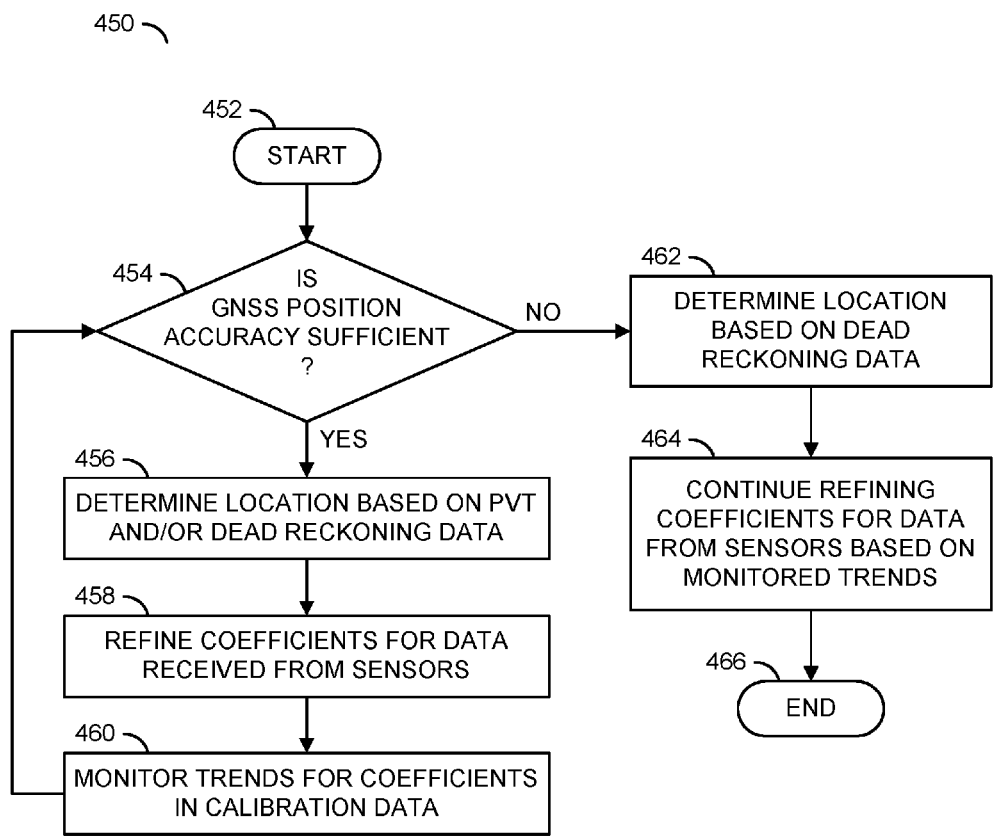
FIG. 9 is a flow diagram illustrating a process for refining coefficients for input from sensors based on monitored trends.

Referring to FIG. 9, a method (or process) 450 is shown. The method 450 may refine coefficients for input from the sensors 140a-140n based on monitored trends. The method 450 generally comprises a step (or state) 452, a decision step (or state) 454, a step (or state) 456, a step (or state) 458, a step (or state) 460, a step (or state) 462, a step (or state) 464, and a step (or state) 466.

The step 452 may start the method 450. Next, in the decision step 454, the processor 102 may determine whether the position accuracy calculated from the signals GNSS_A-GNSS_N (e.g., from the satellites 56a-56n) is sufficient. If the position accuracy calculated from the signals GNSS_A-GNSS_N is sufficient, the method 450 may move to the step 456. In the step 456, the processor 102 and/or the memory 106 may determine a location based on PVT (e.g., the position coordinates 120a) and/or the dead reckoning data 120e (e.g., a dynamically blended solution). Next, in the step 458, the processor 102 and/or the memory 106 may refine the coefficients (e.g., the calibration data 120b) for data received from the sensors 140a-140n. Next, in the step 460, the processor 102 and/or the memory 106 may monitor trends for coefficients in the calibration data 120b. Next, the method 450 may return to the decision step 454.

In the decision step 454, if the position accuracy calculated from the signals GNSS_A-GNSS_N is not sufficient, the method 450 may move to the step 462. In the step 462, the processor 102 and/or the memory 106 may determine location based on the dead reckoning data 120e. Next, in the step 464, the processor 102 and/or the memory 106 may continue refining coefficients for data from the sensors 140a-140n based on the monitored trends (e.g., determined in the step 460). Next, the method 450 may move to the step 466. The step 466 may end the method 450.

The module 100 is shown implemented in the vehicle 52 (shown as a car in FIGS. 1-4). However, the module 100 may be used with other objects and/or vehicles. Generally, the types of sensors 140a-140n implemented may correspond to the type of object implementing the module 100. In some embodiments, the vehicle 52 may be a bicycle and the sensors 140a-140n may comprise a magnetometer, a gyroscope, a pedaling sensor, wheel sensors, etc. In some embodiments, the module 100 may be implemented on a smartphone for determining a location of a pedestrian and/or runner and the sensors 140a-140n may comprise a magnetometer, a gyroscope, a pedometer, etc. Similarly, the module 100 may be implemented in a boat, an airplane, a drone, a fitness monitor, etc.

The functions and structures illustrated in the diagrams of FIGS. 4-9 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

While the invention has been particularly shown and described with reference to the preferred embodiments thereof, it will be understood by those skilled in the art that various changes in form and details may be made without departing from the scope of the invention.

The invention claimed is:

1. A computer readable medium containing processor executable instructions configured to perform the steps of:
   (i) monitoring a positional accuracy of location information calculated based on signals received from GNSS satellites;
   (ii) if said positional accuracy passes a quality check, using said location information to continuously perform a calibration of data received from one or more sensors; and
   (iii) if said positional accuracy does not pass said quality check, cease said calibration of said data received from said sensors, wherein dead reckoning information is calculated from said data received from said sensors.

2. The computer readable medium according to claim 1, wherein a position of a vehicle is determined using (i) said dead reckoning information and (ii) said location information calculated based on said signals received from said GNSS satellites.

3. The computer readable medium according to claim 2, wherein said instructions further comprise performing a dynamic weighting of said dead reckoning information and said location information calculated based on said signals received from said GNSS satellites based on said positional accuracy.

4. The computer readable medium according to claim 3, wherein said dynamic weighting is implemented to prevent reductions in accuracy caused by said dead reckoning information when determining said position of said vehicle.

5. The computer readable medium according to claim 3, wherein said dynamic weighting is configured to favor said location information calculated based on said signals received from said GNSS satellites over said dead reckoning information in open sky conditions.

6. The computer readable medium according to claim 3, wherein said dynamic weighting is configured to increase a reliance on said dead reckoning information when said positional accuracy of said location information calculated based on said signals received from said GNSS satellites is determined to be poor.

7. The computer readable medium according to claim 1, wherein said instructions further comprise performing an update of said calibration of said data received from said sensors after an initial calibration is achieved.

8. The computer readable medium according to claim 7, wherein said update of said calibration is performed while said positional accuracy passes said quality check.

9. The computer readable medium according to claim 7, wherein said update of said calibration is ceased while said positional accuracy does not pass said quality check.

10. An apparatus comprising:
an antenna configured to receive signals from GNSS satellites;
a processor configured to execute instructions; and
a memory configured to store said instructions that, when executed, perform the steps of (i) monitoring a positional accuracy of location information calculated based on said signals received from said GNSS satellites, (ii) if said positional accuracy passes a quality check, using said location information to continuously perform a calibration of data from one or more sensors and (iii) if said positional accuracy does not pass said quality check, cease said calibration of said data received from said sensors, wherein dead reckoning information is calculated from said data received from said sensors.

11. A method for calibrating data used for dead reckoning information received from sensors comprising the steps of:
(A) calculating a location coordinate based on signals received from GNSS satellites;
(B) monitoring a positional accuracy of the location coordinate calculated based on said signals from said GNSS satellites;
(C) if said positional accuracy passes a quality check, using said location coordinate to continuously perform a calibration of data received from one or more sensors; and
(D) if said positional accuracy does not pass said quality check, cease said calibration of said data received from said sensors, wherein said dead reckoning information is calculated from said data received from said sensors.

12. The method according to claim 11, wherein a position of a vehicle is determined using (i) said dead reckoning information and (ii) said location coordinate calculated based on said signals received from said GNSS satellites.

13. The method according to claim 12, wherein said method further comprises performing a dynamic weighting of said dead reckoning information and said location coordinate calculated based on said signals received from said GNSS satellites based on said positional accuracy.

14. The method according to claim 13, wherein said dynamic weighting is implemented to prevent reductions in accuracy caused by said dead reckoning information when determining said position of said vehicle.

15. The method according to claim 13, wherein said dynamic weighting is configured to favor said location coordinate calculated from said signals received from said GNSS satellites over said dead reckoning information in open sky conditions.

16. The method according to claim 13, wherein said dynamic weighting is configured to increase a reliance on said dead reckoning information when said positional accuracy of said location coordinate calculated based on said signals received from said GNSS satellites is determined to be poor.

17. The method according to claim 11, wherein said dead reckoning information is used to supplement said location coordinate calculated based on said signals received from said GNSS satellites when determining a location of a vehicle.

18. The method according to claim 17, wherein data received from said sensors are calibrated before said dead reckoning information is used to supplement said location coordinate calculated based on said signals received from said GNSS satellites.

19. The method according to claim 11, wherein said sensors comprise at least one of a wheel click sensor, a gyroscope, an accelerometer and a vehicle speed sensor.

20. The method according to claim 11, wherein said positional accuracy does not pass said quality check due to at least one of an urban canyon, multipath errors, and other obstructions.

* * * * *